US012725852B2

(12) United States Patent
Lee et al.

(10) Patent No.: US 12,725,852 B2
(45) Date of Patent: Sep. 1, 2026

(54) BATTERY PACK COOLING DEVICE

(71) Applicant: LG Energy Solution, Ltd., Seoul (KR)

(72) Inventors: Sang Yoon Lee, Daejeon (KR); Hyoung Suk Lee, Daejeon (KR); Ju Hwan Shin, Daejeon (KR); Nam Hoon Hur, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 124 days.

(21) Appl. No.: 18/835,276

(22) PCT Filed: Dec. 1, 2023

(86) PCT No.: PCT/KR2023/019651
§ 371 (c)(1),
(2) Date: Aug. 1, 2024

(87) PCT Pub. No.: WO2024/117847
PCT Pub. Date: Jun. 6, 2024

(65) Prior Publication Data

US 2025/0183410 A1 Jun. 5, 2025

(30) Foreign Application Priority Data

Dec. 2, 2022 (KR) ........................ 10-2022-0167119
Mar. 17, 2023 (KR) ........................ 10-2023-0035244

(51) Int. Cl.
*H01M 10/656* (2014.01)
*H01M 10/613* (2014.01)
*H01M 10/6554* (2014.01)

(52) U.S. Cl.
CPC ....... *H01M 10/656* (2015.04); *H01M 10/613* (2015.04); *H01M 10/6554* (2015.04)

(58) Field of Classification Search
CPC ..................................................... F28F 9/0275
USPC ............................................................. 165/8
See application file for complete search history.

(56) References Cited

U.S. PATENT DOCUMENTS

2005/0110274 A1 5/2005 Yoshino
2013/0192807 A1* 8/2013 DeKeuster .......... H01M 10/625 165/173
2018/0212285 A1* 7/2018 Huang .............. H01M 10/6568
2018/0241102 A1* 8/2018 Kim .................. H01M 10/6568
2021/0151821 A1* 5/2021 Shim ................... H01M 10/613
(Continued)

FOREIGN PATENT DOCUMENTS

CN 108172931 A 6/2018
CN 207818838 U 9/2018
(Continued)

OTHER PUBLICATIONS

Extended European Search Report including Written Opinion for Application No. 23898370.4 dated Dec. 11, 2025. 13 pgs.
(Continued)

*Primary Examiner* — Frantz F Jules
(74) *Attorney, Agent, or Firm* — Lerner David LLP

(57) ABSTRACT

Provided is a battery pack cooling device according to example embodiments of the present technology. The battery pack cooling device includes a heat sink, and a pipe assembly coupled to the heat sink. The pipe assembly includes a main pipe, first and second branch pipes, a plurality of branched connectors, a plurality of directional connectors, a plurality of connection pipes, and cooling ports.

18 Claims, 7 Drawing Sheets

(56) References Cited

U.S. PATENT DOCUMENTS

| | | | | |
|---|---|---|---|---|
| 2022/0021090 | A1* | 1/2022 | Shin | H01M 10/482 |
| 2022/0243849 | A1* | 8/2022 | Tembad | H01M 10/625 |
| 2022/0393270 | A1* | 12/2022 | Jeon | H01M 50/209 |

FOREIGN PATENT DOCUMENTS

| | | | | |
|---|---|---|---|---|
| CN | 209016238 | U | 6/2019 | |
| CN | 209786138 | U | 12/2019 | |
| CN | 210668623 | U | 6/2020 | |
| CN | 211017317 | U | 7/2020 | |
| CN | 211455900 | U | 9/2020 | |
| CN | 211929664 | U | 11/2020 | |
| CN | 212584519 | U | 2/2021 | |
| CN | 109149009 | B | 4/2021 | |
| CN | 214706049 | U | 11/2021 | |
| CN | 215568867 | U | 1/2022 | |
| CN | 215644828 | U | 1/2022 | |
| CN | 215955362 | U | 3/2022 | |
| CN | 114725566 | A | 7/2022 | |
| CN | 217762582 | U | 11/2022 | |
| CN | 217848078 | U | 11/2022 | |
| CN | 115566321 | A | 1/2023 | |
| EP | 3386001 | B1 * | 11/2022 | B60L 50/64 |
| JP | H0645191 | U | 6/1994 | |
| JP | H0783370 | A | 3/1995 | |
| JP | 2000283365 | A | 10/2000 | |
| JP | 2005155766 | A | 6/2005 | |
| JP | 2010077846 | A | 4/2010 | |
| JP | 2016201172 | A | 12/2016 | |
| JP | 2021034184 | A | 3/2021 | |
| KR | 101367210 | B1 | 2/2014 | |
| KR | 2021-0127317 | A | 10/2021 | |
| KR | 102358425 | B1 | 2/2022 | |
| KR | 2022-0144730 | A | 10/2022 | |

OTHER PUBLICATIONS

Written Opinion of the International Searching Authority for Application No. PCT/KR2023/019651 mailed Feb. 26, 2024. 4 pgs.

International Search Report for Application No. PCT/KR2023/019651 mailed Feb. 26, 2024. 3 pgs.

* cited by examiner

BATTERY PACK COOLING DEVICE

CROSS-REFERENCE TO RELATED APPLICATIONS

This application is a national phase entry under 35 U.S.C. § 371 of International Application No. PCT/KR2023/019651 filed Dec. 1, 2023, published in Korean, which claims the benefit of Korean Patent Application No. 10-2022-0167119, filed on Dec. 2, 2022, and Korean Patent Application No. 10-2023-0035244, filed on Mar. 17, 2023, all of which are incorporated herein by reference.

FIELD OF THE INVENTION

The present invention relates to a battery pack cooling device.

BACKGROUND OF THE INVENTION

A secondary battery can be charged and discharged a plurality of times unlike a primary battery. Secondary batteries have been widely used as energy sources for various types of wireless devices such as handsets, laptop computers, and cordless vacuum cleaners. Recently, a main use of secondary batteries is moving from mobile devices to mobility, as manufacturing costs per unit capacity of secondary batteries drastically decrease due to improved energy density and economies of scale and a range of battery electric vehicles (BEVs) increases to the same level as fuel vehicles.

As secondary batteries are used for mobility, the demand for the safety of secondary batteries is increasing. A driver's life may be in danger when an accident such as fire occurs in a secondary battery used for mobility and thus research on technology for enhancing the safety of secondary batteries is indispensable. In particular, cooling technology for maintaining temperature of a secondary battery in operation is directly related to the lifespan and performance of the secondary battery as well as the stability of the secondary battery, and thus, many studies are being conducted on cooling technology of secondary batteries.

BRIEF SUMMARY OF THE INVENTION

The present invention is directed to providing a battery pack cooling device with improved reliability.

To address the above problem, embodiments of the present invention provide a battery pack cooling device. The battery pack cooling device includes a heat sink extending in a first direction and including a plurality of cooling channels spaced apart from each other in a second direction perpendicular to the first direction, and a pipe assembly coupled to the heat sink.

The pipe assembly includes: a main pipe; a first branch pipe and a second branch pipe connected to the main pipe, wherein a first branch point that is a node between the first branch pipe and the main pipe is more distant from the heat sink than a second branch point that is a node between the second branch pipe and the main pipe; a plurality of branched connectors connected to the first branch pipe and the second branch pipe; a plurality of connection pipes connected to the plurality of branched connectors; a plurality of directional connectors spaced apart from the plurality of branched connectors with the plurality of connection pipes interposed therebetween and connected to the plurality of connection pipes; and a plurality of cooling ports configured to connect the plurality of branched connectors and the plurality of directional connectors to the plurality of cooling channels.

Each of the plurality of branched connectors and the plurality of directional connectors may include a port clamp configured to fix one of the plurality of cooling ports.

Each of the plurality of branched connectors and the plurality of directional connectors may include a port coupling part to be connected to one of the plurality of cooling ports.

Each of the plurality of branched connectors may include first and second pipe coupling parts.

Each of the first pipe coupling parts may be connected to the first and second branch pipes.

Each of the second pipe coupling parts may be connected to the plurality of connection pipes.

Each of the plurality of connection pipes may include a bent portion, and an angle between the first and second branch pipes may be the same as a bending angle of the bent part of each of the plurality of connection pipes.

Each of the plurality of directional connectors may not include a branched structure.

Each of the plurality of directional connectors may include only one pipe coupling part.

A length of the first branch pipe in the second direction may be greater than a length of the second branch pipe in the second direction.

Each of the plurality of branched connectors may include a port coupling part connected to a corresponding coupling part among the plurality of cooling ports.

Each of the plurality of branched connectors may have a symmetrical shape with respect to the port coupling part.

Each of the plurality of branched connectors may include a port coupling part connected to a corresponding coupling part among the plurality of cooling ports.

Each of the plurality of branched connectors may have an asymmetrical shape with respect to the port coupling part.

Example embodiments of the present invention provide a battery pack cooling device. The battery pack cooling device includes a heat sink with a plurality of cooling channels connected in series, and a pipe assembly coupled to the heat sink, in which the pipe assembly includes a plurality of cooling ports connected to the plurality of cooling channels, and a plurality of directional connectors each including a port coupling part connected to a corresponding cooling port among the plurality of cooling ports, a port clamp configured to fix the corresponding cooling port, and a pipe coupling part. The pipe coupling part of each of the plurality of directional connectors is connected to the connection pipe.

Example embodiments of the present invention provide a battery pack cooling device. The battery pack cooling device includes a heat sink with a plurality of cooling channels connected in parallel, and a pipe assembly coupled to the heat sink, in which the pipe assembly includes a plurality of cooling ports connected to the plurality of cooling channels, a branched connector with a port coupling part connected to a corresponding cooling port among the plurality of cooling ports, a port clamp configured to fix the corresponding cooling port, a first pipe coupling part, and a second pipe coupling part.

Example embodiments of the present invention provide a battery pack cooling device. The battery pack cooling device includes a heat sink with a plurality of first cooling channels connected in series and a plurality of second cooling channels connected in parallel, and a pipe assembly coupled to the heat sink, in which the pipe assembly includes a plurality of directional connectors connected to the plurality of first cooling channels and including a pipe coupling part, a branched connector connected to one of the plurality of second cooling channels and including a first pipe coupling part and a second pipe coupling part, and a plurality of connection pipes connected to one of the pipe coupling part, the first pipe coupling part, and the second pipe coupling part.

The pipe coupling parts of the plurality of directional connectors may be connected to each other through one of the plurality of connection pipes.

A battery pack cooling device according to example embodiments of the present invention includes branched connectors and a directional quick connector. Accordingly, a brazing process and a welding process are not required to configure the battery pack cooling device, and a quick cooling design may be implemented.

Effects achievable from example embodiments of the present invention are not limited to the above-described effects, and other effects that are not described herein will be clearly derived and understood by those of ordinary skilled in the art to which the example embodiments of the present invention pertain from the following description. That is, unintended effects achieved when the example embodiments of the present invention are implemented are derivable by those of ordinary skilled in the art from the example embodiments of the present invention.

DETAILED DESCRIPTION

Figure 1:
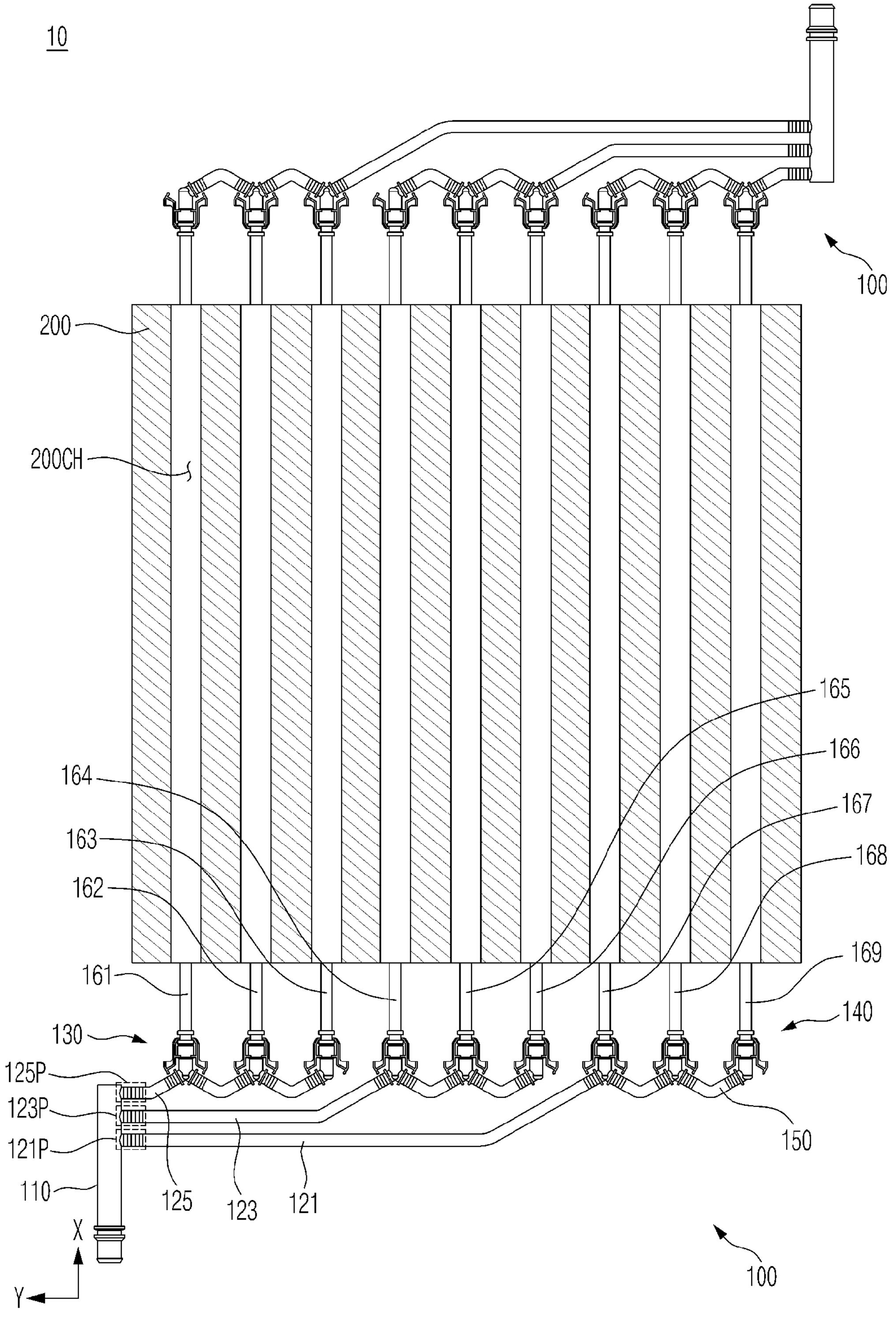
FIG. 1 is a plan view for describing a battery pack cooling device according to example embodiments.

Hereinafter, embodiments of the present invention will be described in detail with reference to the accompanying drawings. Before describing embodiments of the present invention, the terms or expressions used in the present specification and claims should not be construed as being limited to as generally understood or as defined in commonly used dictionaries, and should be understood according to meanings and concepts matching corresponding to the present invention on the basis of the principle that the inventor(s) of the application can appropriately define the terms or expressions to optimally explain the present invention.

Therefore, embodiments set forth herein and configurations illustrated in the drawings are only embodiments of the present invention and do not reflect all the technical ideas of the present invention and thus it should be understood that various equivalents and modifications that replace the configurations would have been made at the filing date of the present application.

Well-known configurations or functions related to describing the present invention are not described in detail when it is determined that they would obscure the subject matter of the present invention due to unnecessary detail.

Because embodiments of the present invention are provided to more fully explain the present invention to those of ordinary skill in the art, the shapes, sizes, etc. of components illustrated in the drawings may be exaggerated, omitted, or schematically illustrated for clarity. Therefore, it should not be understood that the sizes or proportions of components fully reflect the actual sizes or proportions thereof.

First Embodiment

FIG. 1 is a plan view for describing a battery pack cooling device 10 according to example embodiments.

Figure 2:
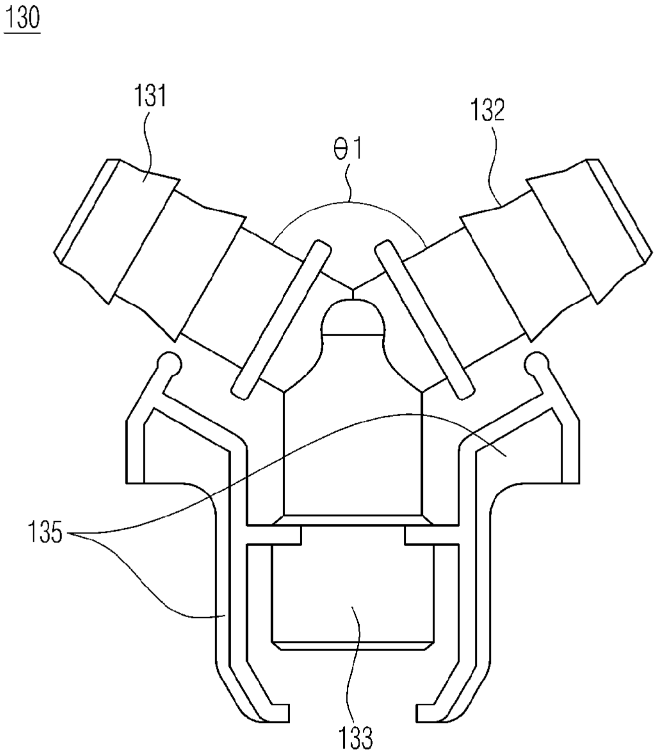
FIG. 2 illustrates a branched connector of FIG. 1.

FIG. 2 illustrates a branched connector 130 of FIG. 1.

Figure 3:
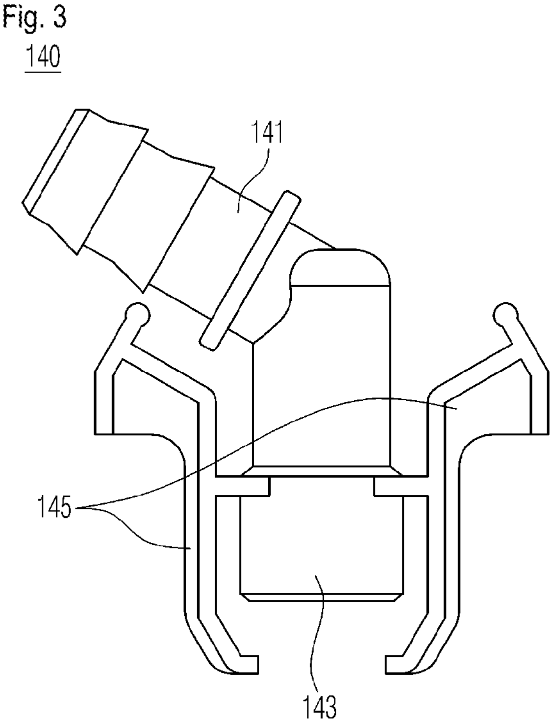
FIG. 3 illustrates a directional connector of FIG. 1.

FIG. 3 illustrates a directional connector 140 of FIG. 1.

Figure 4:
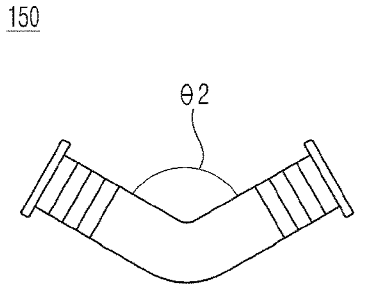
FIG. 4 illustrates a connection pipe of FIG. 1.

FIG. 4 illustrates a connection pipe 150 of FIG. 1.

Referring to FIGS. 1 to 4, the battery pack cooling device 10 may include pipe assemblies 100 and a heat sink 200. According to example embodiments, the heat sink 200 may be configured to cool a heat source (e.g., a battery cell assembly) through direct or indirect thermal contact. As a non-limiting example, the heat sink 200 may be a support plate configured to support a heating source (e.g., a plurality of battery cell assemblies). As a non-limiting example, the heat sink 200 may be an upper cooling device disposed on a heating source (e.g., a plurality of battery cell assemblies) and covering the heating source (e.g., a plurality of battery cell assemblies). A thermal interface material (TIM) may be interposed between the heat sink 200 and a heat source (e.g., multiple battery cell assemblies).

As a non-limiting example, the heat sink 200 may be provided through an extrusion process. According to example embodiments, the heat sink 200 may include a plurality of cooling channels 200CH. Each of the plurality of cooling channels 200CH may provide a passage through which a cooling fluid flows. Each of the plurality of cooling channels 200CH may extend in an X-axis direction.

One end of each of the plurality of cooling channels 200CH in the X-axis direction may be referred to as an inlet and another end thereof in the X-axis direction may be referred to as an outlet. The plurality of cooling channels 200CH may be spaced apart from each other in the Y-axis direction. The heat sink 200 may further include cavities between the plurality of cooling channels 200CH. The cavities may extend in the X-axis direction.

Each of the pipe assemblies 100 may include a main pipe 110, first to third branch pipes 121, 123, and 125, a plurality of branched connectors 130, a plurality of directional connectors 140, a plurality of connection pipes 150, and a plurality of cooling ports 161, 162, 163, 164, 165, 166, 167, 168, and 169.

Each of the pipe assemblies 100 may be coupled to the heat sink 200. Each of the pipe assemblies 100 may be configured to distribute or collect a cooling fluid according to cooling design of the battery pack cooling device 10. The pipe assemblies 100 of the present embodiment may be configured according to a 3P (parallel)-3P (parallel) design. That is, the cooling ports 161, 162, and 163 connected in parallel may form a first group, the cooling ports 164, 165, and 166 connected in parallel may form a second group, and the cooling ports 167, 168, and 169 connected in parallel may form a third group. The first to third groups may be respectively connected to the first to third branch pipes 121, 123, and 125 connected in parallel to the main pipe 110.

Thus, each of the pipe assemblies 100 may be configured according to the 3P-3P design including a parallel connection of two hierarchies.

One of the pipe assemblies 100 may correspond to injection of a cooling fluid into the heat sink 200, and the other pipe assembly 100 may correspond to discharging of the cooling fluid from the heat sink 200. One of the pipe assemblies 100 may be configured to supply the cooling fluid to the heat sink 200, and the other pipe assembly 100 may be configured to discharge the cooling fluid flowing through the cooling channels 200CH of the heat sink 200. Accordingly, one of the pipe assemblies 100 may be referred to as a supply pipe assembly, and the other pipe assembly 100 may be referred to as a discharge pipe assembly. The supply pipe assembly may be connected to inlets of the plurality of cooling channels 200CH, and the discharge pipe assembly may be connected to outlets of the plurality of cooling channels 200CH.

A relationship between elements of each of the pipe assemblies 100 described with respect to the discharge of the cooling fluid is substantially the same as a relationship between the elements of each of the pipe assemblies 100 described with respect to the supply of the cooling fluid, except for a direction of the flow of the cooling fluid. Therefore, even when a particular element of each of the pipe assemblies 100 is described with respect to the supply or discharge of the cooling fluid, those of ordinary skill in the art will be able to easily derive characteristics and properties of the particular element with respect to the supply or discharge of the cooling fluid, based on the above description.

The main pipe 110 may be connected to a cooling fluid source (or a cooling fluid sink). The main pipe 110 may perform the overall supply of the cooling fluid to the heat sink 200 (or the overall discharge of the cooling fluid from the heat sink 200). Pipes of various paths and designs may be provided between the main pipe 110 and the cooling fluid source.

The main pipe 110 may be connected to the first to third branch pipes 121, 123, and 125. The cooling fluid transferred to the main pipe 110 may be distributed to the first to third branch pipes 121, 123, and 125. The first to third branch pipes 121, 123, and 125 may be coupled to the main pipe 110 by a method such as welding and brazing.

According to example embodiments, a first branch point 121P that is a node between the first branch pipe 121 and the main pipe 110 may be more distant from the heat sink 200 in the X-axis direction than a second branch point 123P that is a node between the second branch pipe 123 and the main pipe 110. According to example embodiments, the second branch point 123P that is a node between the second branch pipe 123 and the main pipe 110 may be more distant from the heat sink 200 in the X-axis direction than a third branch point 125P that is a node between the third branch pipe 125 and the main pipe 110.

According to example embodiments, a length of the first branch pipe 121 in the Y-axis direction may be greater than a length of the second branch pipe 123 in the Y-axis direction. According to example embodiments, the length of the second branch pipe 123 in the Y-axis direction may be greater than a length the third branch pipe 125 in the Y-axis direction.

Accordingly, the differences between supply (or discharge) paths of the cooling fluid through the first to third branch pipes 121, 123, and 125 may decrease and uniformity of cooling of the heat sink 200 may be achieved.

According to example embodiments, each of the plurality of branched connectors 130 may include first and second pipe coupling parts 131 and 132, a port coupling part 133, and a port clamp 135.

The plurality of branched connectors 130 may have a symmetric shape with respect to the port coupling part 133. Accordingly, the first and second pipe coupling parts 131 and 132 may have substantially the same shape. An angle θ1 between the first and second pipe coupling parts 131 and 132 may be greater than 90 degrees. The angle θ1 between the first and second pipe coupling parts 131 and 132 may be less than 180 degrees.

Some of the plurality of branched connectors 130 may be connected to the first to third branch pipes 121, 123, and 125. The branched connectors 130 connected to the first to third branch pipes 121, 123, and 125 may be referred to as first branched connectors, based on a connection order. The first branched connectors may be connected to the cooling ports 161, 164, and 167.

The first pipe coupling part 131 of each of the branched connectors 130 connected to the first to third branch pipes 121, 123, and 125 may be connected to the first to third branch pipes 121, 123, and 125. The second pipe coupling part 132 of each of the branched connectors 130 connected to the first to third branch pipes 121, 123, and 125 may be connected to the connection pipe 150.

Each of the first and second pipe coupling parts 131 and 132 of the branched connectors 130 that are not connected to the first to third branch pipes 121, 123, and 125 may be connected to the connection pipes 150. The branched connectors 130 having the first and second pipe coupling parts 131 and 132 each is connected to the connection pipes 150 may be referred to as second branched connectors, based on a connection order. The second branched connectors may be connected to the cooling ports 162, 165, and 168.

The cooling fluid supplied through the first pipe coupling parts 131 of the branched connectors 130 connected to the first to third branch pipes 121, 123, and 125 may flow to the second pipe coupling part 132 and the port coupling part 133. The cooling fluid introduced through the port coupling parts 133 of the branched connectors 130 connected to the first to third branch pipes 121, 123, and 125 may flow to the first and second pipe coupling parts 131 and 132.

The connection pipes 150 may each include a bent portion. A bending angle θ2 of the bent portion of each of the connection pipes 150 may be greater than 90 degrees. The bending angle θ2 of the bent portion of each of the connection pipes 150 may be less than 180 degrees. An angle θ1 between the first and second pipe coupling parts 131 and 132 may be substantially the same as the bending angle θ2 of the bent portion of each of the connection pipes 150.

According to example embodiments, the plurality of directional connectors 140 may include a pipe coupling part 141, a port coupling part 143, and a port clamp 145. According to example embodiments, each of the plurality of directional connectors 140 may have an asymmetrical shape with respect to the port coupling part 143. According to example embodiments, the plurality of directional connectors 140 may include only one pipe coupling part 141. According to example embodiments, each of the plurality of directional connectors 140 may not include a branched structure.

Here, the inclusion of the branched structure should be understood to mean two or more outlets are provided to distribute a cooling fluid introduced from one inlet. That is, an element including the branched structure includes three or more paths.

According to example embodiments, the plurality of directional connectors 140 may be configured to transmit an entire fluid introduced into the pipe coupling part 141 to the port coupling part 143. According to example embodiments, the plurality of directional connectors 140 may be configured to transmit an entire fluid introduced into the port coupling part 143 to the pipe coupling part 141. Accordingly, the fluid introduced into the pipe coupling part 141 may flow to the port coupling part 143 without branching, and the fluid introduced through the port coupling part 143 may flow to the pipe coupling part 141 without branching.

The plurality of directional connectors 140 may be spaced apart from the plurality of branched connectors 130 with the connection pipes 150 interposed therebetween. The plurality of directional connectors 140 may be connected to connection pipes 150 connected to the second branched connectors. The pipe coupling parts 141 of the plurality of directional connectors 140 may be connected to the connection pipes 150.

The plurality of branched connectors 130 and the connection pipes 150 may be fixed to each other by an insertion method or an interference fitting method. The plurality of directional connectors 140 and the connection pipes 150 may be fixed to each other by the insertion method or the interference fitting method.

The plurality of cooling ports 161 to 169 may be connected to the plurality of cooling channels 200CH of the heat sink 200. The plurality of cooling ports 161 to 169 may be sequentially arranged. That is, a leading one among the plurality of cooling ports 161 to 169 may be closer to the main pipe 110 in the Y-axis direction than a following one among the plurality of cooling ports 161 to 169. For example, the cooling port 161 is closer to the main pipe 110 than the cooling port 162.

A cooling fluid supplied through the plurality of cooling ports 161 to 169 may flow along the plurality of cooling channels 200CH. The cooling fluid flowing along the plurality of cooling channels 200CH may be discharged through the plurality of cooling ports 161 to 169.

The plurality of cooling ports 161, 162, 164, 165, 167, and 168 may be connected to the plurality of branched connectors 130. Each of the plurality of cooling ports 161, 162, 164, 165, 167, and 168 may be connected to the port coupling part 133 of one of the plurality of branched connectors 130. The port coupling part 133 of each of the plurality of branched connectors 130 may be connected to a corresponding one among the plurality of cooling ports 161, 162, 164, 165, 167, and 168.

Each of the plurality of cooling ports 161, 162, 164, 165, 167, and 168 may be fixed by the port clamp 135 of one of the plurality of branched connectors 130. The port clamp 135 of each of the plurality of branched connectors 130 may fix a corresponding one among the plurality of cooling ports 161, 162, 164, 165, 167, and 168. Accordingly, each of the plurality of cooling ports 161, 162, 164, 165, 167, and 168 may not be welded or brazed with one of the plurality of branched connectors 130.

The plurality of cooling ports 163, 166, and 169 may be connected to the plurality of directional connectors 140. Each of the plurality of cooling ports 163, 166, and 169 may be connected to the port coupling part 143 of one of the plurality of directional connectors 140. The port coupling part 143 of each of the plurality of directional connectors 140 may be connected to a corresponding one among the plurality of cooling ports 163, 166, and 169.

Each of the plurality of cooling ports 163, 166, and 169 may be fixed by the port clamp 145 of one of the plurality of directional connectors 140. The port clamp 145 of each of the plurality of directional connectors 140 may fix a corresponding one among the plurality of cooling ports 163, 166, and 169. Each of the plurality of cooling ports 163, 166, and 169 may not be welded or brazed with one of the plurality of directional connectors 140.

Second Embodiment

Figure 5:
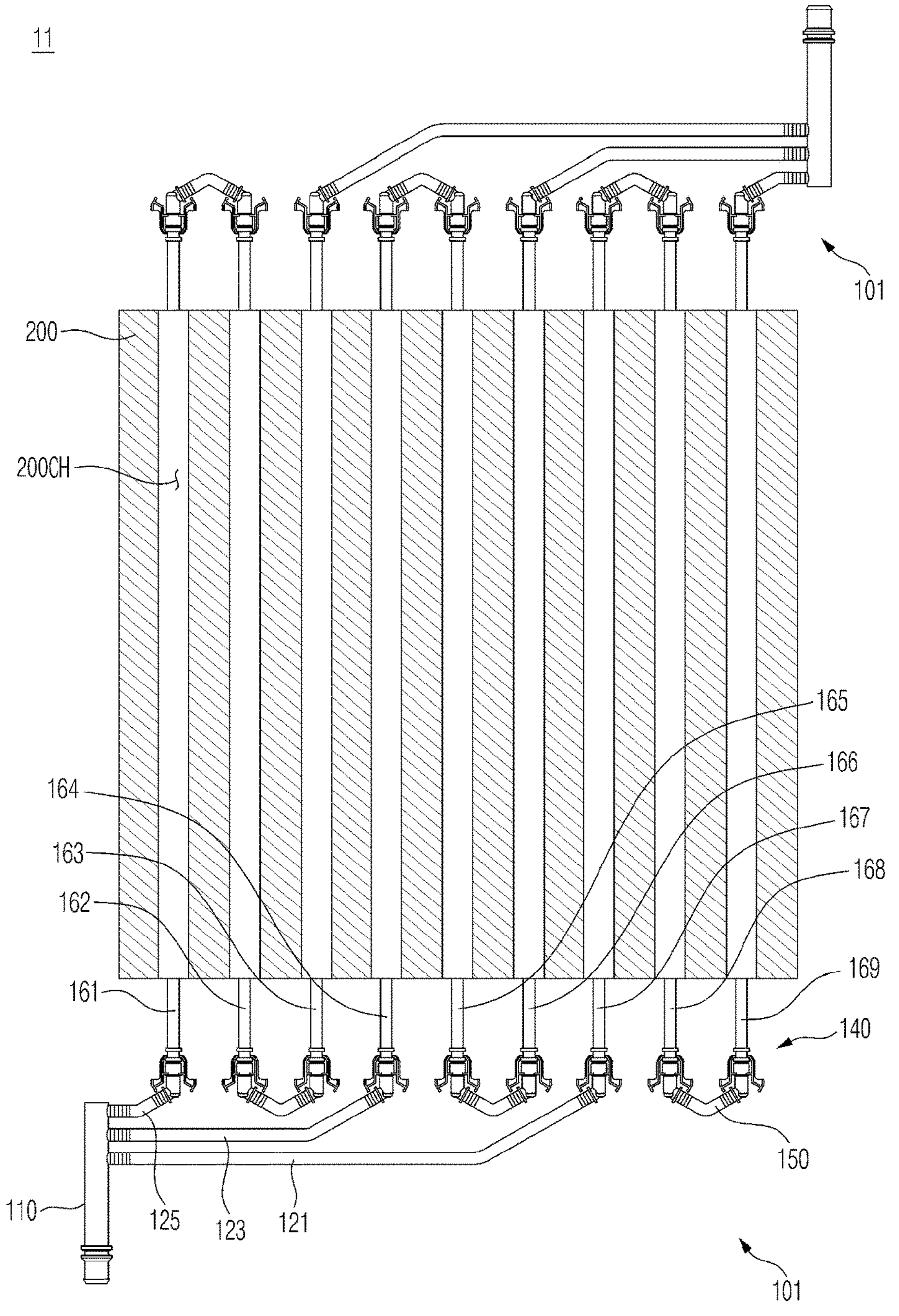
FIG. 5 is a diagram for describing a battery pack cooling device according to other example embodiments.

FIG. 5 is a diagram for describing a battery pack cooling device 11 according to other example embodiments.

Referring to FIG. 5, the battery pack cooling device 11 may include pipe assemblies 101 and a heat sink 200.The heat sink 200 is substantially the same as that described above with reference to FIGS. 1 to 4.

Each of the pipe assemblies 101 may include a main pipe 110, first to third branch pipes 121, 123, and 125, a plurality of directional connectors 140, a plurality of connection pipes 150, and a plurality of cooling ports 161 to 169.Each of the pipe assemblies 101 of the present embodiment may not include a plurality of branched connectors 130.

The main pipe 110, the first to third branch pipes 121, 123, and 125, the plurality of directional connectors 140, the plurality of connection pipes 150, and the plurality of cooling ports 161 to 169 are substantially the same as those described above with reference to FIGS. 1 to 4, except for a correlation between the plurality of directional connectors 140 and the plurality of connection pipes 150.

The pipe assemblies 101 may be configured to distribute or collect a cooling fluid according to a cooling design of the battery pack cooling device 11. More specifically, the pipe assemblies 101 of the present embodiment may be configured according to a 3P-3S (series) design. That is, the cooling ports 161, 162, and 163 connected in series may form a first group, the cooling ports 164, 165, and 166 connected in series may form a second group, and the cooling ports 167, 168, and 169 connected in series may form a third group. The first to third groups may be respectively connected to the first to third branch pipes 121, 123, and 125 connected in parallel to the main pipe 110. Accordingly, the pipe assemblies 100 may be configured according to a 3P-3S design including a serial connection of one hierarchy and a parallel connection of one hierarchy.

In the present example, for the configuration of groups connected in series, each of the plurality of cooling ports 161 to 169 may be connected to one of the plurality of directional connectors 140. For example, a cooling fluid introduced into the cooling port 161 and flowing through the cooling channel 200CH may be transferred to the cooling channel 200CH connected to the cooling port 162 by one of the plurality of directional connectors 140. The cooling fluid flowing through the cooling channel 200CH connected to the cooling port 162 may be transferred to the cooling channel 200CH connected to the cooling port 163 by another of the plurality of directional connectors 140. Accordingly, the cooling fluid may be discharged from the heat sink 200 after sequentially flowing through the cooling channel 200CH connected to the cooling port 161, the cooling channel 200CH connected to the cooling port 162, and the cooling channel 200CH connected to the cooling port 163.

The serial connection of the cooling ports 164, 165, and 166 and the serial connection between the cooling ports 167, 168, and 169 are also similar to the serial connection of the cooling ports 161, 162, and 163 and thus a redundant description thereof is omitted here.

Third Embodiment

Figure 6:
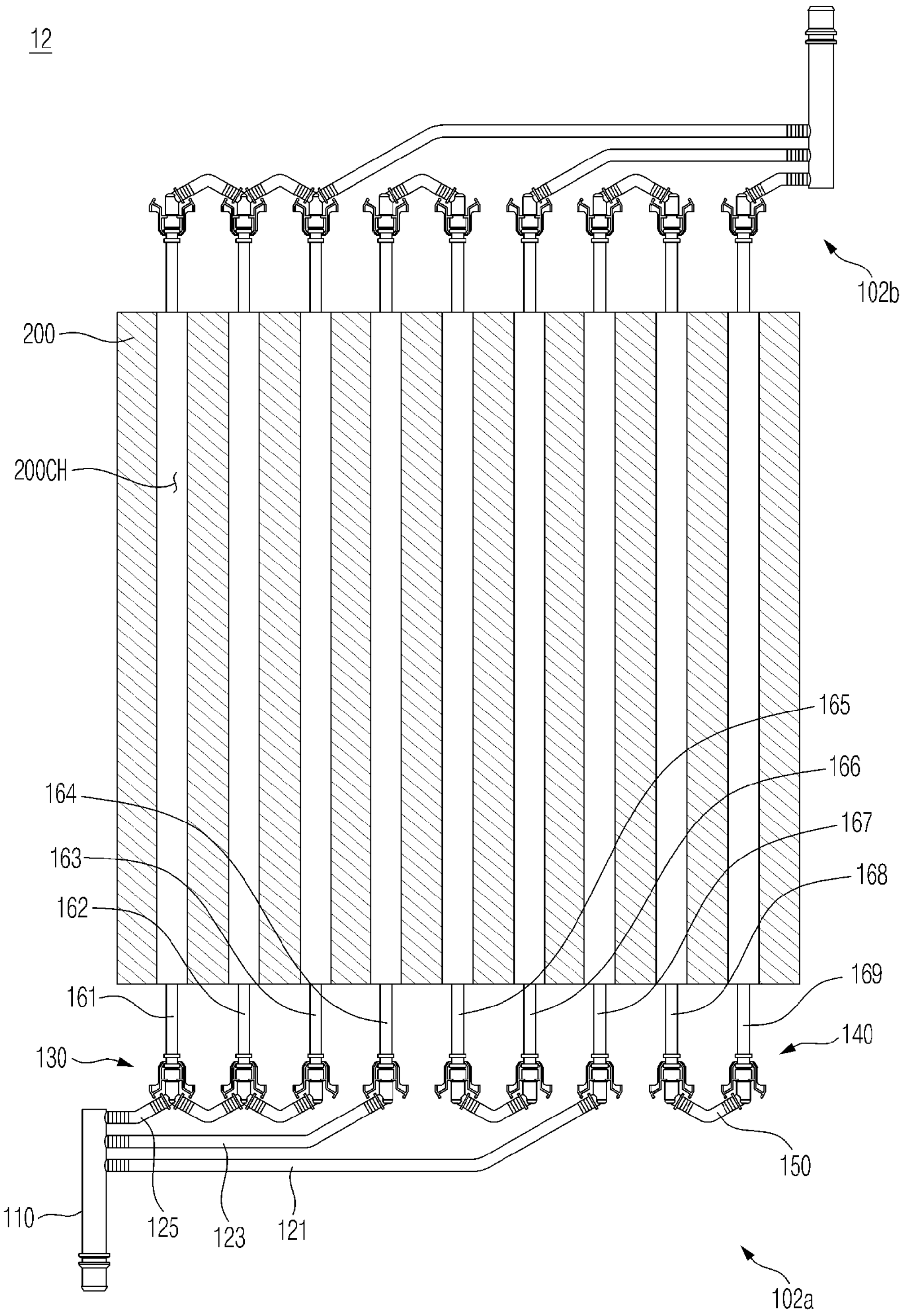
FIG. 6 is a diagram for describing a battery pack cooling device according to other example embodiments.

FIG. 6 is a diagram for describing a battery pack cooling device 12 according to other example embodiments.

Referring to FIG. 6, the battery pack cooling device 12 may include pipe assemblies 102*a* and 102*b* and a heat sink 200.

As described above with reference to FIGS. 1 to 4, the heat sink 200 may include a plurality of cooling channels 200CH. Cooling channels connected in series among the plurality of cooling channels 200CH may be referred to as first cooling channels, and cooling channels connected in parallel among the plurality of cooling channels 200CH may be referred to as second cooling channels.

Each of the pipe assemblies 102*a* and 102*b* may include a main pipe 110, first to third branch pipes 121, 123, and 125, a plurality of branched connectors 130, a plurality of directional connectors 140, a plurality of connection pipes 150, and a plurality of cooling ports 161 to 169. The cooling ports 164, 165, and 166 may be connected in series to each other, the cooling ports 167, 168, and 169 may be connected in series to each other, and the cooling ports 161, 162, and 163 may be connected in parallel to each other.

Configurations of the cooling ports 164, 165, and 166 connected in series, the cooling ports 167, 168, and 169 connected in series, and the plurality of directional connectors 140 connected thereto and a correlation therebetween are similar to those described above with reference to FIG. 5, and thus, a redundant description thereof is omitted here.

In addition, configurations of the cooling ports 161, 162, and 163 connected in parallel, the plurality of branched connectors 130 connected thereto, and the plurality of directional connectors 140 and a correlation therebetween are similar to those described above with reference to FIGS. 1 to 4, and thus a redundant description thereof is omitted here.

Fourth Embodiment

Figure 7:
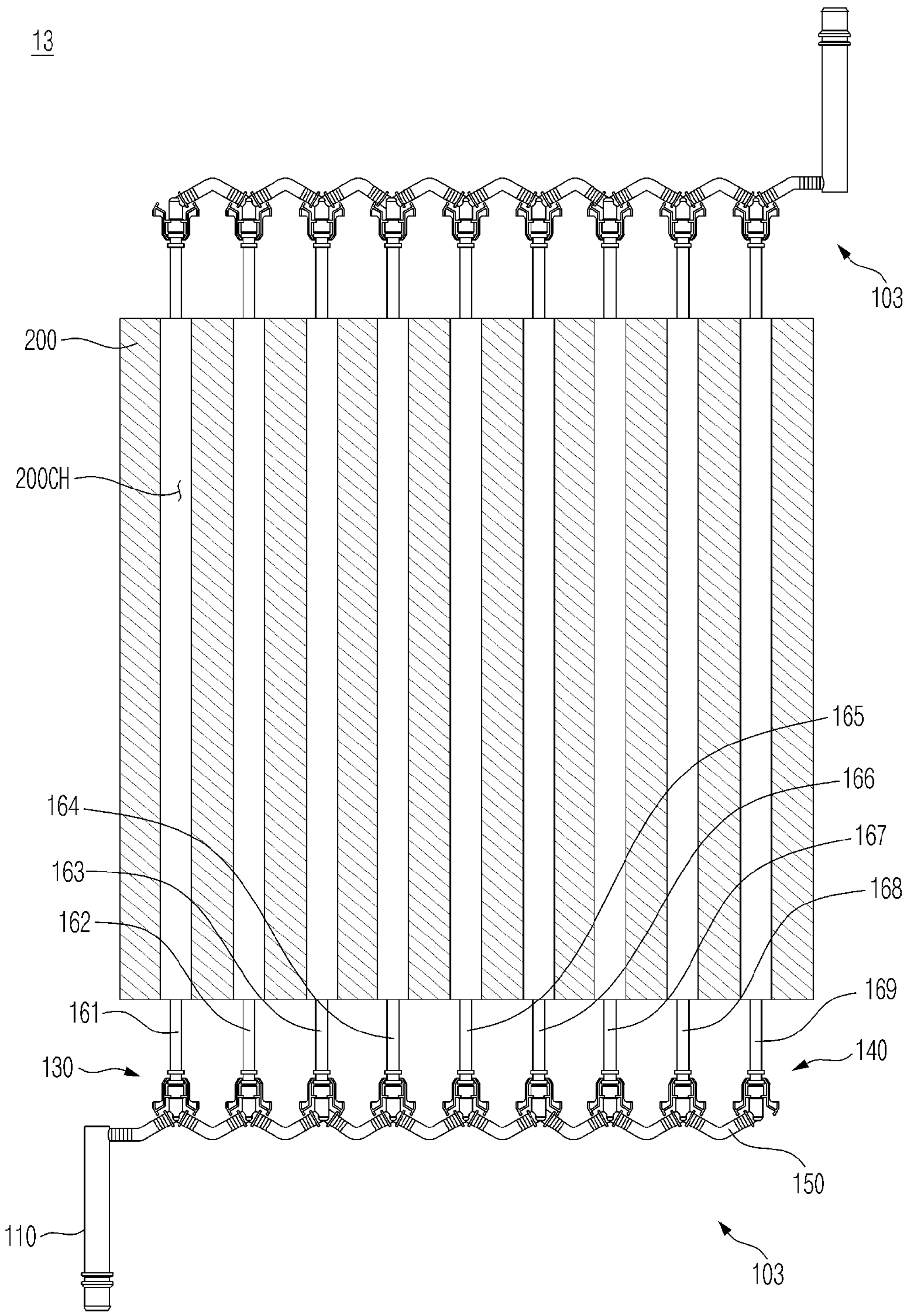
FIG. 7 is a diagram for describing a battery pack cooling device according to other example embodiments.

FIG. 7 is a diagram for describing a battery pack cooling device 13 according to other example embodiments.

Referring to FIG. 7, the battery pack cooling device 13 may include pipe assemblies 103 and a heat sink 200.The heat sink 200 is substantially the same as that described above with reference to FIGS. 1 to 4.

Each of the pipe assemblies 103 may include a main pipe 110, a plurality of branched connectors 130, a directional connector 140, a plurality of connection pipes 150, and a plurality of cooling ports 161 to 169. Each of the pipe assemblies 103 of the present embodiment may not include branch pipes connected to the main pipe 110. The plurality of cooling ports 161 to 169 of the pipe assemblies 103 according to the present embodiment may be connected in parallel.

Each of the cooling ports 161 to 168 may be connected to each of the plurality of branched connectors 130. The plurality of connection pipes 150 may connect neighboring ones among the plurality of branched connectors 130 to each other or connect the plurality of connectors 130 and the directional connector 140. The cooling port 169 may be connected to the directional connector 140. Accordingly, each of the pipe assemblies 103 may be configured according to a 9P design (or 9P-1S design) including a parallel connection of one hierarchy.

Fifth Embodiment

Figure 8:
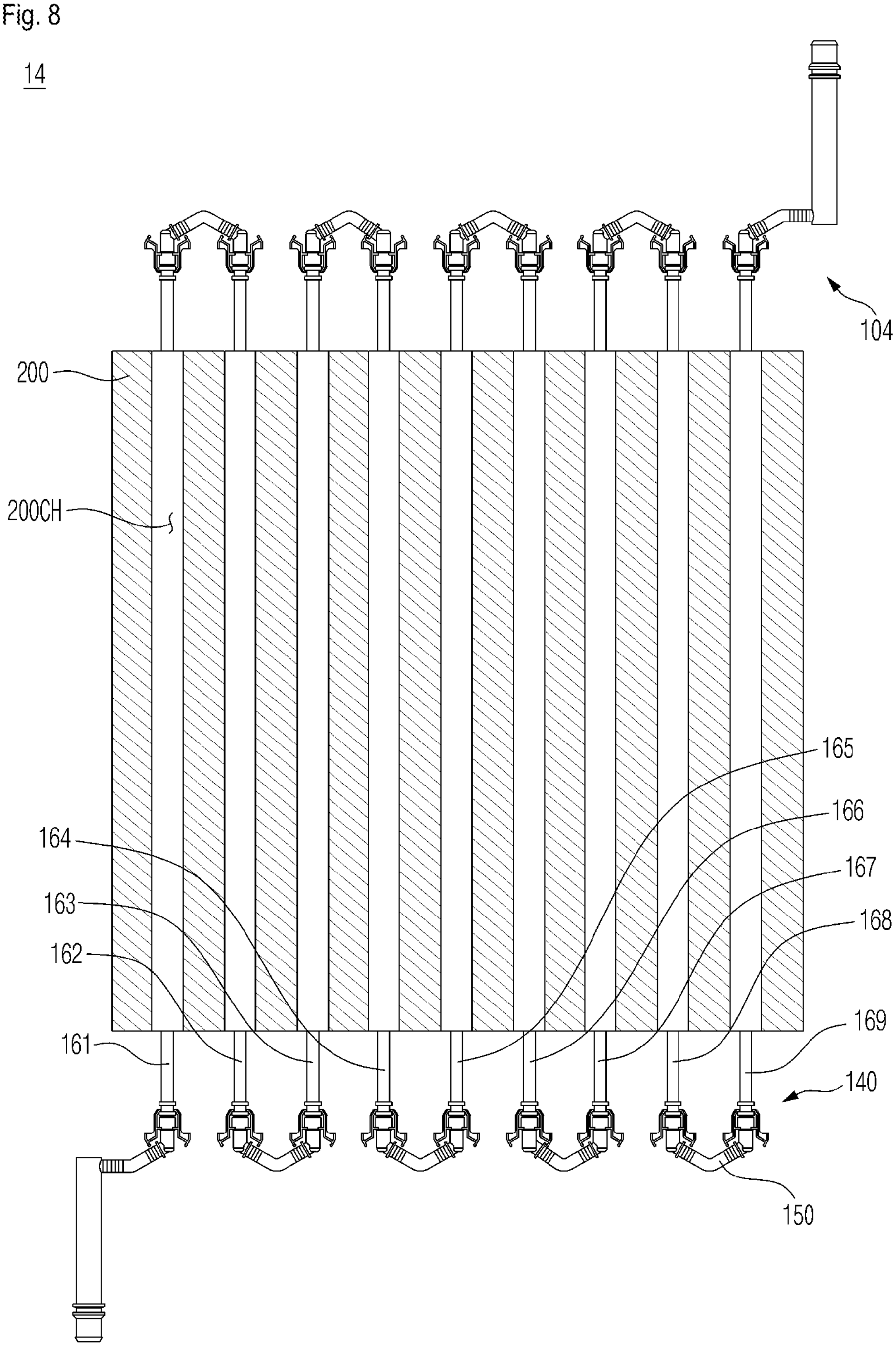
FIG. 8 is a diagram for describing a battery pack cooling device according to other example embodiments.

FIG. 8 is a diagram for describing a battery pack cooling device 14 according to other example embodiments.

Referring to FIG. 8, the battery pack cooling device 14 may include pipe assemblies 104 and a heat sink 200. The heat sink 200 is substantially the same as that described above with reference to FIGS. 1 to 4.

Each of the pipe assemblies 104 may include a main pipe 110, a directional connector 140, a plurality of connection pipes 150, and a plurality of cooling ports 161 to 169. Each of the pipe assemblies 104 of the present embodiment may not include branch pipes connected to the main pipe 110. Each of the pipe assemblies 104 of the present embodiment may not include branched connectors. The plurality of cooling ports 161 to 169 of the pipe assemblies 104 according to the present embodiment may be connected in series.

The cooling ports 161 to 169 may be connected to the plurality of directional connectors 140. The plurality of connection pipes 150 may connect neighboring ones among the plurality of directional connectors 140. Accordingly, a path of a cooling fluid sequentially flowing through the cooling ports 161 to 169 may be formed. Accordingly, each of the pipe assemblies 104 may be configured according to the 9S design (or 9S-1S design) including a serial connection of one hierarchy.

Sixth Embodiment

Figure 9:
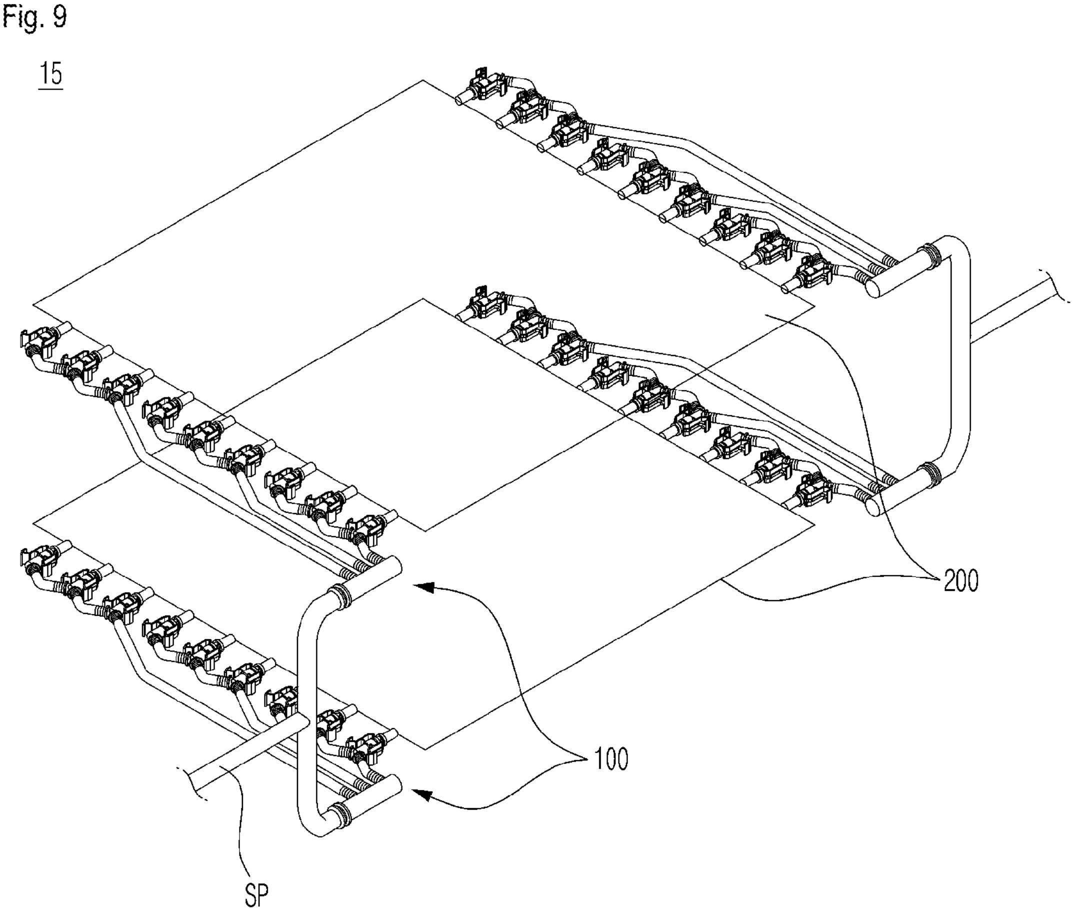
FIG. 9 is a diagram for describing a battery pack cooling device according to other example embodiments.

FIG. 9 is a diagram for describing a battery pack cooling device 15 according to other example embodiments.

According to example embodiments, the battery pack cooling device 15 may include a system pipe SP, pipe assemblies 100, and heat sinks 200. The battery pack cooling device 15 may be a dual cooling device.

The pipe assemblies 100 and the heat sinks 200 are the same as those described above with reference to FIGS. 1 to 4, except that they are arranged in a double layer. The device pipe SP may be configured to supply a cooling fluid to the pipe assemblies 100 or discharge a cooling fluid transferred through the pipe assemblies 100.

A lower one among the heat sinks 200 may be a support plate configured to support a heat source (e.g., a plurality of battery cell assemblies), and an upper one among the heat sinks 200 may be an upper cooling device placed above the heat source (e.g., the plurality of battery cell assemblies) and covering the heat source (e.g., the plurality of battery cell assemblies).

Those of ordinary skill in the art will be able to easily derive an embodiment of the battery pack cooling device 15 of FIG. 9, in which four pipe assemblies 100 are replaced with the pipe assemblies 101 of FIG. 5, the pipe assemblies 102*a* and 102*b* of FIG. 6, the pipe assemblies 103 of FIG. 7, or the pipe assemblies 104 of FIG. 8. In addition, it will be understood by those of ordinary skill in the art that there may be a different correlation between pipe assemblies disposed at opposite ends of each of the heat sinks 200. For example, the pipe assemblies 100 of FIG. 1 may be connected to inlets of the heat sinks 200, and the pipe assemblies 101 of FIG. 5 may be connected to outlets of the heat sinks 200.

The present invention has been described above in more detail with reference to the drawings, the embodiments, etc. However, the configurations illustrated in the drawings or embodiments described in the present specification are only embodiments of the present invention and do not reflect all the technical ideas of the present invention and thus it should be understood that various equivalents and modifications that replace the configurations would have been made at the filing date of the present application.

The invention claimed is:

1. A battery pack cooling device comprising:

a heat sink extending in a first direction and including a plurality of cooling channels spaced apart from each other in a second direction perpendicular to the first direction; and a pipe assembly coupled to the heat sink, wherein the pipe assembly includes:

a main pipe;

a first branch pipe and a second branch pipe connected to the main pipe, wherein a first branch point that is a node between the first branch pipe and the main pipe is more distant from the heat sink than a second branch point that is a node between the second branch pipe and the main pipe;

a plurality of branched connectors connected to the first branch pipe and the second branch pipe;

a plurality of connection pipes connected to the plurality of branched connectors;

a plurality of directional connectors spaced apart from the plurality of branched connectors with the plurality of connection pipes interposed therebetween and connected to the plurality of connection pipes; and a plurality of cooling ports configured to connect the plurality of branched connectors and the plurality of directional connectors to the plurality of cooling channels.

2. The battery pack cooling device of claim 1, wherein each of the plurality of branched connectors and the plurality of directional connectors includes a port clamp configured to be affixed to one of the plurality of cooling ports.

3. The battery pack cooling device of claim 1, wherein each of the plurality of branched connectors and the plurality of directional connectors includes a port coupling part configured to be connected to one of the plurality of cooling ports.

4. The battery pack cooling device of claim 1, wherein a length of the first branch pipe in the second direction is greater than a length of the second branch pipe in the second direction.

5. The battery pack cooling device of claim 1, wherein each of the plurality of branched connectors includes a port coupling part configured to be connected to a corresponding coupling part among the plurality of cooling ports, and each of the plurality of branched connectors has a symmetrical shape with respect to the port coupling part.

6. The battery pack cooling device of claim 1, wherein each of the plurality of directional connectors includes a port coupling part configured to be connected to a corresponding coupling part among the plurality of cooling ports, and each of the plurality of directional connectors has an asymmetrical shape with respect to the port coupling part.

7. The battery pack cooling device of claim 1, wherein the plurality of cooling ports define pipe-shaped extensions projecting outwardly from a side of the heat sink along the first direction.

8. The battery pack cooling device of claim 1, wherein each of the plurality of branched connectors and the plurality of directional connectors includes a connector configured to be affixed to one of the plurality of cooling ports by biasing into engagement with the respective one of the plurality of cooling ports.

9. The battery pack cooling device of claim 1, wherein each of the plurality of branched connectors includes first and second pipe coupling parts, each of the first pipe coupling parts is configured to be connected to one of the first and second branch pipes, and each of the second pipe coupling parts is configured to be connected to one of the plurality of connection pipes.

10. The battery pack cooling device of claim 9, wherein each of the plurality of connection pipes includes a bent portion, and an angle between the first and second branch pipes is the same as a bending angle of the bent portion of each of the plurality of connection pipes.

11. The battery pack cooling device of claim 1, wherein none of the plurality of directional connectors includes a branched structure.

12. The battery pack cooling device of claim 11, wherein each of the plurality of directional connectors includes only one pipe coupling part.

13. The battery pack cooling device of claim 1, wherein the plurality of cooling ports communicate with the plurality of cooling channels so as to pass cooling fluid to or from the cooling channels through the cooling ports.

14. The battery pack cooling device of claim 13, wherein each of the plurality of cooling ports defines a pipe-shaped extension connected to a respective end of one of the plurality of cooling channels.

15. A battery pack cooling device comprising:

a heat sink including a plurality of cooling channels connected in series; and a pipe assembly coupled to the heat sink, wherein the pipe assembly includes:

a plurality of cooling ports connected to the plurality of cooling channels; and a plurality of directional connectors each including a port coupling part connected to a corresponding cooling port among the plurality of cooling ports, a port clamp configured to fix the corresponding cooling port, and a pipe coupling part, and the pipe coupling part of each of the plurality of directional connectors is connected to a connection pipe.

16. A battery pack cooling device comprising:

a heat sink including a plurality of cooling channels connected in parallel; and a pipe assembly coupled to the heat sink, wherein the pipe assembly includes:

a plurality of cooling ports connected to the plurality of cooling channels;

a branched connector including a port coupling part connected to a corresponding cooling port among the plurality of cooling ports, a port clamp configured to fix the corresponding cooling port, a first pipe coupling part, and a second pipe coupling part.

17. A battery pack cooling device comprising:

a heat sink including a plurality of first cooling channels connected in series and a plurality of second cooling channels connected in parallel; and a pipe assembly coupled to the heat sink, wherein the pipe assembly includes:

a plurality of directional connectors connected to the plurality of first cooling channels and including a pipe coupling part;

a branched connector connected to one of the plurality of second cooling channels and including a first pipe coupling part and a second pipe coupling part; and a plurality of connection pipes connected to one of the pipe coupling part, the first pipe coupling part, and the second pipe coupling part.

18. The battery pack cooling device of claim 17, wherein the pipe coupling parts of the plurality of directional connectors are connected to each other through one of the plurality of connection pipes.

* * * * *